Aug. 11, 1925.

A. V. ROSELL 1,549,613

ANIMAL TRAP

Filed Nov. 20, 1924

2 Sheets-Sheet 1

INVENTOR
A. V. Rosell
BY
Sigmund Herzog
ATTORNEY

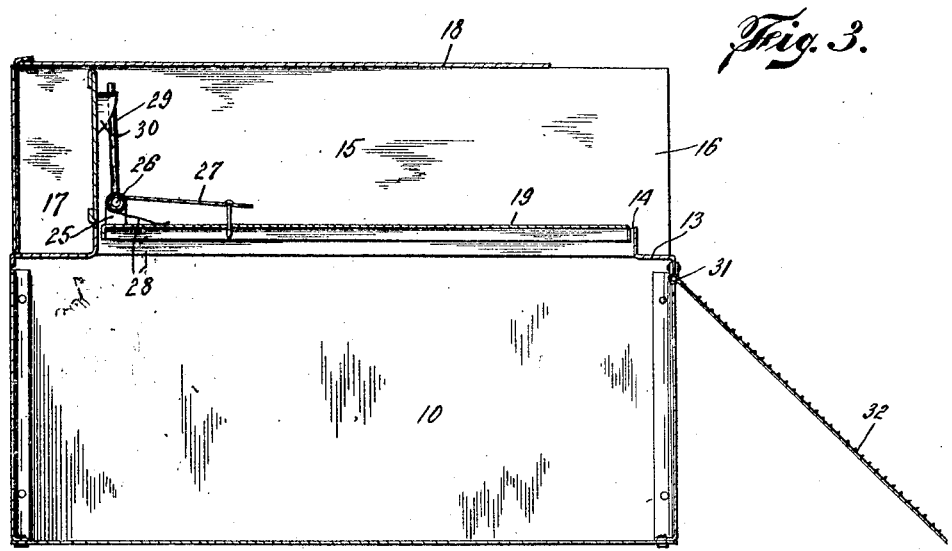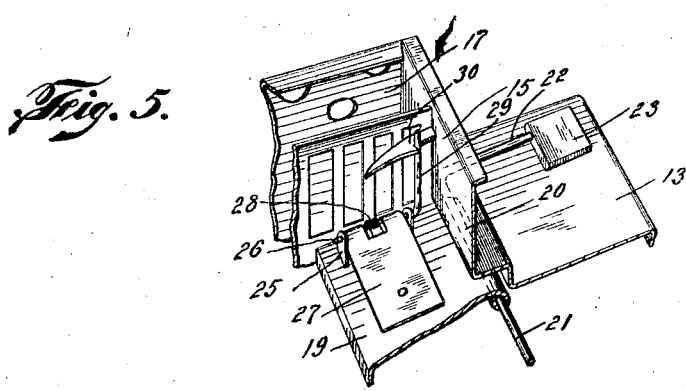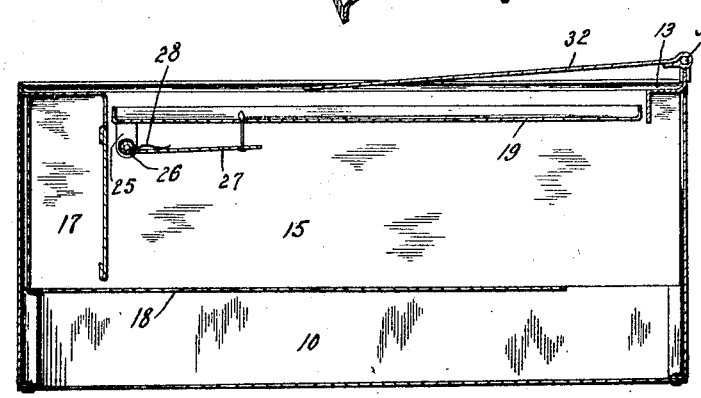

Patented Aug. 11, 1925.

1,549,613

UNITED STATES PATENT OFFICE.

ALBERT V. ROSELL, OF NEW YORK, N. Y.

ANIMAL TRAP.

Application filed November 20, 1924. Serial No. 750,971.

*To all whom it may concern:*

Be it known that I, ALBERT V. ROSELL, a citizen of Peru, and resident of the city of New York, in the county of New York and State of New York, have invented certain new and useful Improvements in Animal Traps, of which the following is a specification.

The present invention relates to improvements in animal traps, and more particularly to such which are automatically reset after entrapping a victim, so as to be in condition to catch the next victim.

The main object of the invention is to provide a simple, inexpensive and efficient trap, which is adapted to be manufactured on a commercial scale, or in other words one which is not so difficult to make as to be beyond the reasonable cost of such a contrivance.

A further object of the invention is to so construct the trap that it may be conveniently folded into a package of small size, for shipping purposes.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1:
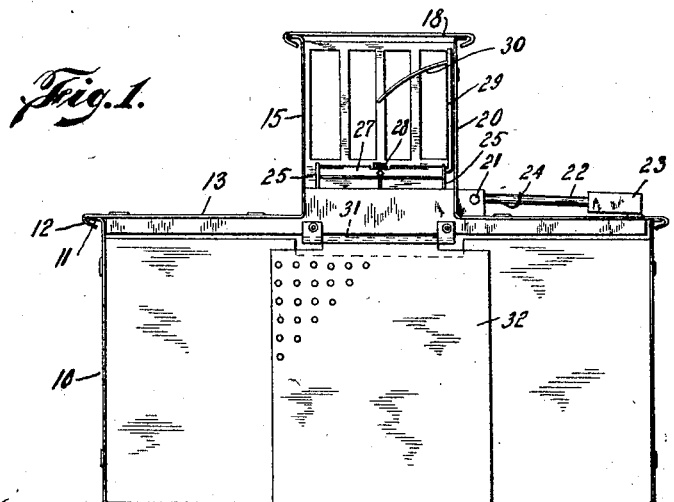
Figure 2:
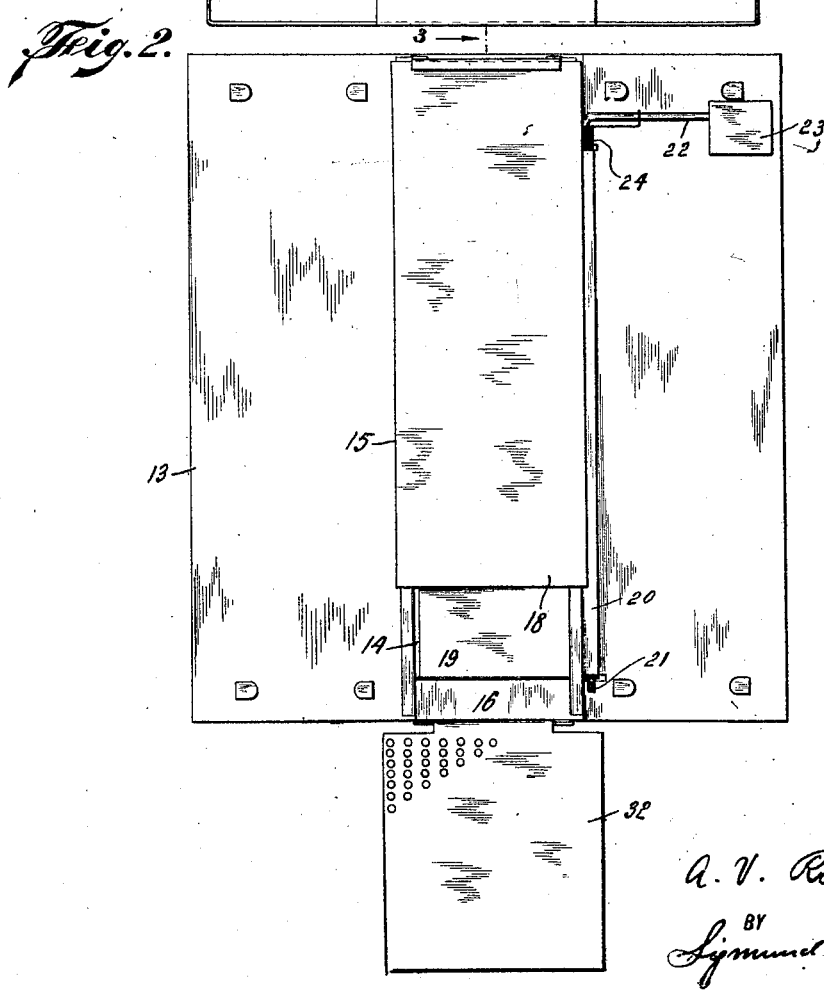

Figure 1 is a front elevation of a trap constructed in accordance with the present invention; Fig. 2 is a top elevation thereof; Fig. 3 is a section taken on line 3—3 of Fig. 2; Fig. 4 is a vertical longitudinal section taken through the trap in its folded state; and Fig. 5 is a perspective view of the resetting means of the trap.

In the drawings, the numeral 10 indicates a box, which may be made of sheet iron or some other suitable material. The longitudinal top edges of this box are bent horizontally outwards, as indicated at 11, forming flanges, with which are adapted to be engaged longitudinal guides 12 of a plate member 13, that forms the cover of the said box. In this cover is provided, preferably, centrally an elongated opening 14, around which is built a cage 15, the latter being open at its front 16, while in its rear portion is formed a bait chamber 17. The cover 18 of the cage 15 is removable, so that access may be conveniently had to the bait chamber, when bait is to be placed into the same. The opening 14 in the top 13 is normally closed by a trap door 19, the latter being hinged along one of its longitudinal edges to one of the longitudinal sides 20 of the cage 15. The pintle 21 of the hinge is provided with a sidewardly extending projection 22, to the free end of which is fixed a weight 23, which, in addition to a spring 24, keeps the trap door in its closing, horizontal position, the spring and weight being just sufficient to overcome the weight of the said trap door. In front of the bait chamber 17 are provided two upwardly extending lugs 25 on the trap door 19. In these lugs is journaled a spindle 26, extending horizontally and transversely of the cage 15. To this spindle is fixed a platform 27, that is normally held by a spring 28 in its elevated position, shown in Figs. 3 and 5 of the drawings. The spindle 26 is provided with a vertically extending arm 29, which is adapted to engage a catch 30, projecting into the cage 15 from the side wall 20 of the latter.

To the cage 15 is pivoted at 31 a running board 32, to provide means for animals to easily run up to the said cage.

The operation of this device is as follows: In Figs. 1 to 3, inclusive, of the drawings, the trap is shown in its operative position, in which the trap door 19 is disposed horizontally, closing the opening 14 in the top 13 of the box 10. This box constitutes the entrapping compartment of the contrivance. The animal, attracted by the bait in the bait chamber 17, runs up the inclined running board 32, entering the cage 15. As the animal moves toward the bait chamber, it depresses by its weight the tilting platform 27, whereby the arm 29 is disengaged from the catch 30, the weight of the animal then tilting the trap door 19, whereby the animal is precipitated into the entrapping compartment 10. The weight 23 and spring 24 thereafter return the trap door 19 to its closing position, the arm 29 engaging the catch 30. The trap is thus reset for the next victim. Into the entrapping compartment may be placed water, to drown the victims.

It will be observed that the bait chamber is inaccessible to the animals, either from the inside or the outside of the cage 15, and hence the bait is never eaten and may be used indefinitely.

If the trap is to be packed for shipping purposes, the cover 13 with the elements thereon is removed from the box 10, and is placed in inverted position onto the said box. In this position, as appears from Fig. 4 of the drawings, the cage 15 is disposed within the box 10 and the runway 32 is folded up against the cover. A parcel of small size is thus obtained.

What I claim is:

A trap comprising an entrapping compartment, a cover thereon having an entrance opening, a pivoted trap door on said cover closing said opening, overbalancing means connected with said trap door, an entrance compartment on said cover built around said trap door provided with a bait chamber opposite the entrance opening to the last-mentioned compartment, a tilting platform on said trap door adjacent said bait chamber, an arm fixed to said tilting platform, a catch within said entrance compartment co-operating with said arm for holding said trap door in its closing position against the weight of the animal, said arm being released by said catch when the animal steps on said tilting platform, said overbalancing means being heavier than the weight of said trap door and the platform thereon, and a runway pivoted to said cover, said cover with the elements thereon being removable from said entrapping compartment and being adapted to be inverted so that the elements on said cover are disposed within said entrapping compartment, said runway being adapted to be folded against said cover after the latter with the elements thereon have been disposed within said entrapping compartment.

Signed at New York, in the county of New York, and State of New York, this 5th day of November, A. D. 1924.

ALBERT V. ROSELL.